United States Patent
Tanabe et al.

(10) Patent No.: US 10,116,787 B2
(45) Date of Patent: Oct. 30, 2018

(54) ELECTRONIC DEVICE, CONTROL METHOD, AND NON-TRANSITORY STORAGE MEDIUM

(71) Applicant: Kyocera Corporation, Kyoto-shi, Kyoto (JP)

(72) Inventors: Shigeki Tanabe, Yokohama (JP); Hideki Morita, Yokohama (JP); Isao Masuike, Machida (JP)

(73) Assignee: Kyocera Corporation, Kyoto (JP)

( * ) Notice: Subject to any disclaimer, the term of this patent is extended or adjusted under 35 U.S.C. 154(b) by 9 days.

(21) Appl. No.: 15/546,399

(22) PCT Filed: Jan. 28, 2016

(86) PCT No.: PCT/JP2016/052502
§ 371 (c)(1),
(2) Date: Jul. 26, 2017

(87) PCT Pub. No.: WO2016/121876
PCT Pub. Date: Aug. 4, 2016

(65) Prior Publication Data
US 2018/0007192 A1   Jan. 4, 2018

(30) Foreign Application Priority Data
Jan. 29, 2015 (JP) ................. 2015-015755

(51) Int. Cl.
*H04M 1/67* (2006.01)
*H04M 1/725* (2006.01)
(Continued)

(52) U.S. Cl.
CPC .... *H04M 1/72569* (2013.01); *G06K 9/00013* (2013.01); *G06K 9/00087* (2013.01);
(Continued)

(58) Field of Classification Search
CPC ............... H04M 1/72569; H04M 1/67; H04M 2250/12; G06K 9/00087; G06K 9/00013; G07C 9/00158; G06F 3/0484; G06F 3/041
See application file for complete search history.

(56) References Cited

U.S. PATENT DOCUMENTS

| 7,965,873 B2 | 6/2011 | Goto |
| 2017/0205894 A1* | 7/2017 | Bae ..................... G06F 3/017 |

FOREIGN PATENT DOCUMENTS

| JP | 2007-310638 A | 11/2007 |
| JP | 2009-159539 A | 7/2009 |

(Continued)

OTHER PUBLICATIONS

International Search Report (Form PCT/ISA/210) dated Mar. 8, 2016, issued for PCT/JP2016/052502.
(Continued)

*Primary Examiner* — Chuong A Ngo (57) ABSTRACT

An electronic device includes a display, and at least one controller that, when an operation to cancel limitation of operations of the electronic device is detected, is configured to cancel the limitation of operations and presents a first screen on the display. The at least one controller is further configured to present a second screen which is different from the first screen on the display when the operation to cancel the limitation of operations is an operation with a thumb.

8 Claims, 8 Drawing Sheets

(51) Int. Cl.
    *G07C 9/00* (2006.01)
    *G06K 9/00* (2006.01)
    *G06F 3/0484* (2013.01)
(52) U.S. Cl.
    CPC .......... *G07C 9/00158* (2013.01); *H04M 1/67* (2013.01); *G06F 3/0484* (2013.01); *H04M 2250/12* (2013.01)

(56) References Cited

FOREIGN PATENT DOCUMENTS

| JP | 2013-047919 A | 3/2013 |
| JP | 2013-164692 A | 8/2013 |
| JP | 2014-103595 A | 6/2014 |
| JP | 2015-153231 A | 8/2015 |

OTHER PUBLICATIONS

Written Opinion (Form PCT/ISA/237) dated Mar. 8, 2016, issued for PCT/JP2016/052502.

* cited by examiner

ELECTRONIC DEVICE, CONTROL METHOD, AND NON-TRANSITORY STORAGE MEDIUM

CROSS-REFERENCE TO RELATED APPLICATION

This application is a national stage of PCT International Application No. PCT/JP2016/052502 filed in Japan on Jan. 28, 2016, which claims priority to and incorporates by reference the entire contents of Japanese Patent Application No. 2015-015755 filed in Japan on Jan. 29, 2015.

FIELD

The present invention relates to an electronic device, a control method, and a non-transitory storage medium.

BACKGROUND

Some of electronic devices, such as mobile phones or smartphones, use a fingerprint/thumbprint authentication function to authenticate a user.

SUMMARY

The above-described electronic devices have room for improvements in controlling a display function due to authentication of a user.

An electronic device, a control method and a non-transitory storage medium are disclosed.

According to one aspect, there is provided an electronic device comprising a display and at least one controller that, when an operation to cancel limitation of operations of the electronic device is detected, is configured to cancel the limitation of operations and presents a first screen on the display. The at least one controller is further configured to present a second screen which is different from the first screen on the display when the operation to cancel the limitation of operations is an operation with a thumb.

According to one aspect, there is provided a control method that is implemented by an electronic device that includes a display. The control method includes, when an operation to cancel limitation of operations of the electronic device is detected, canceling the limitation of operations and presenting a first screen on the display, and presenting a second screen which is different from the first screen on the display when the operation to cancel the limitation of operations is an operation with a thumb.

According to one aspect, there is provided a non-transitory storage medium that stores a control program causing an electronic device, including a display, to execute, when an operation to cancel limitation of operations of the electronic device is detected, canceling the limitation of operations and presenting a first screen on the display. The control program further causes the electronic device to execute presenting a second screen which is different from the first screen on the display when the operation to cancel the limitation of operations is an operation with a thumb.

The above and other objects, features, advantages and technical and industrial significance of this application will be better understood by reading the following detailed description of presently preferred embodiments of the application, when considered in connection with the accompanying drawings.

DETAILED DESCRIPTION OF THE PREFERRED EMBODIMENTS

Embodiments for implementing the electronic device, the control method, and the control program according to the subject application are explained in detail with reference to the drawings. As an example of the electronic device, a smartphone is explained below.

Embodiments

Figure 1:
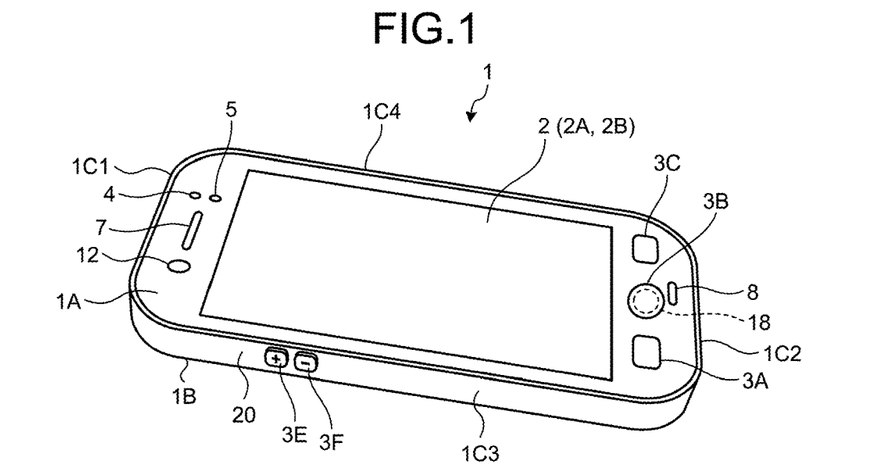
FIG. 1 is a perspective view of a smartphone according to embodiments.
Figure 2:
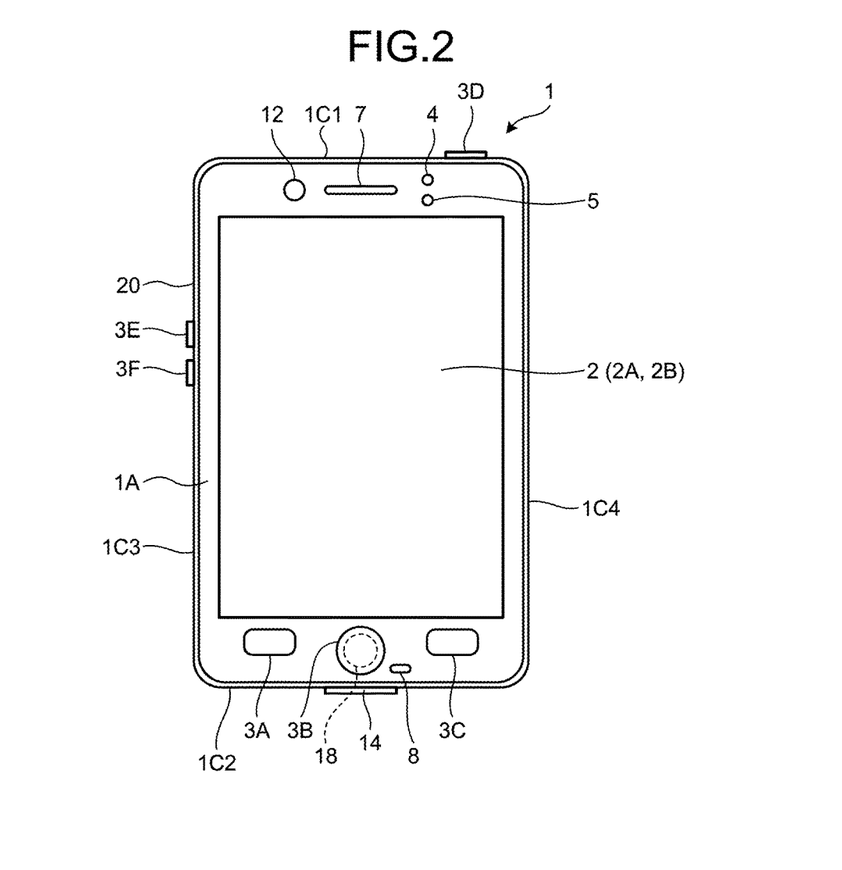
FIG. 2 is a front view of the smartphone.
Figure 3:
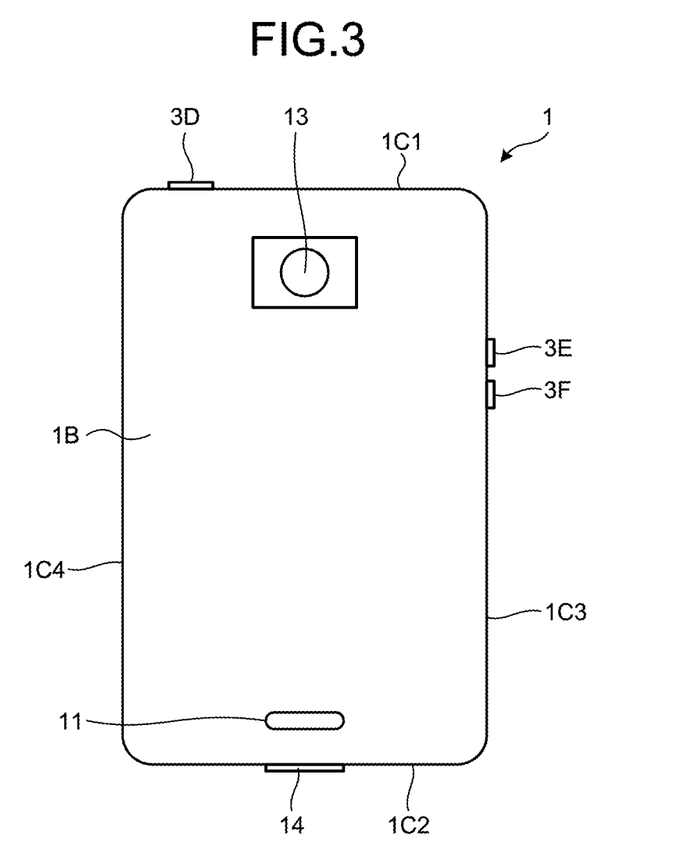
FIG. 3 is a back view of the smartphone.

With reference to FIG. 1 to FIG. 3, the overall configuration of a smartphone 1 according to embodiments is explained. As illustrated in FIG. 1 to FIG. 3, the smartphone 1 includes a housing 20. The housing 20 includes a front face 1A, a rear face 1B, and side faces 1C1 to 1C4. The front face 1A is a front face of the housing 20. The rear face 1B is a rear face of the housing 20. The side faces 1C1 to 1C4 are side faces that connect the front face 1A and the rear face 1B. Hereafter, the side faces 1C1 to 1C4 are sometimes collectively referred to as a side face 1C without each face being specified.

A touch screen display 2, buttons 3A to 3C, a illuminance sensor 4, a proximity sensor 5, a receiver 7, a microphone 8, a camera 12, and a fingerprint/thumbprint sensor 18 are provided on the front face 1A of the smartphone 1. A speaker 11 and a camera 13 are provided on the rear face 1B of the smartphone 1. Buttons 3D to 3F and a connector 14 are provided on the side face 1C of the smartphone 1. Hereafter, the buttons 3A to 3F are sometimes collectively referred to as a button 3 without each button specified.

The touch screen display 2 includes a display 2A and a touch screen 2B. According to the example in FIG. 1, each of the display 2A and the touch screen 2B is substantially rectangular in shape; however, the shapes of the display 2A and the touch screen 2B are not limited thereto. Each of the display 2A and the touch screen 2B may have any shape, such as a square or a circle. According to the example in FIG. 1, the display 2A and the touch screen 2B are located in an overlapped manner; however, the positions of the display 2A and the touch screen 2B are not limited thereto. For example, the display 2A and the touch screen 2B may be located side by side or located apart from each other. According to the example in FIG. 1, a long side of the display 2A is arranged along a long side of the touch screen 2B, and a short side of the display 2A is arranged along a short side of the touch screen 2B; however, the way of overlapping the display 2A and the touch screen 2B is not limited thereto. When the display 2A and the touch screen 2B are located in an overlapped manner, for example, one or more sides of the display 2A do not need to be arranged along any side of the touch screen 2B.

The display 2A includes a display device, such as a liquid crystal display (LCD: Liquid Crystal Display), an organic EL display (OELD: Organic Electro-Luminescence Display), or an inorganic EL display (IELD: Inorganic Electro-Luminescence Display). The display 2A presents texts, images, symbols, graphics, or the like.

The touch screen 2B detects contact with the touch screen 2B with a finger, a pen, a stylus pen, or the like. The touch screen 2B may detect positions of the contacts with the touch screen 2B with multiple fingers, pens, stylus pens, or the like. In the following explanations, the finger, pen, stylus pen, or the like, which is in contact with the touch screen 2B, is sometimes referred to as a "contact object" or "contact matter".

A detection system of the touch screen 2B may be any system, such as a capacitive system, a resistance film system, a surface acoustic wave system (or an ultrasonic system), an infrared system, an electromagnetic induction system, or a load sensing system. In the following explanations, for ease of explanation, it is assumed that the user touches the touch screen 2B by using a finger to operate the smartphone 1.

The smartphone 1 determines type of gesture based on at least one of the contact that is detected by the touch screen 2B, the position where the contact is detected, a change in the position between the contacts, the interval between the contacts, and the number of times the contact is detected. The gesture is an operation that is performed on the touch screen 2B. Examples of the gesture, determined by the smartphone 1, include, but are not limited to, touch, long touch, release, swipe, tap, double tap, long tap, drag, flick, pinch-in, pinch-out, etc.

The smartphone 1 performs operations in accordance with the gestures that are determined through the touch screen 2B. Thus, the operability that is intuitive and easy-to-use for users may be achieved. The operation that is performed by the smartphone 1 in accordance with the determined gesture is sometimes different depending on the screen that is presented on the display 2A. In the following explanations, for ease of explanation, "the touch screen 2B detects the contact and the smartphone 1 determines that the type of gesture is X based on the detected contact" is sometimes described as "the smartphone detects X" or "the controller detects X".

The fingerprint/thumbprint sensor 18 reads the concavity and convexity of the fingerprint/thumbprint on the fingertip/thumb-tip as an image. The fingerprint/thumbprint sensor 18 is built in the button 3B. The fingerprint/thumbprint sensor 18 may output the read image as fingerprint/thumbprint information. For example, when the fingerprint/thumbprint sensor 18 is a semiconductor sensor, it may detect electric charge of electrodes, which are changed due to the concavity and convexity of the fingerprint/thumbprint, and convert the amount of electric charge to obtain the image. The fingerprint/thumbprint sensor 18 is not limited to a semiconductor sensor, and an optical sensor or an ultrasonic sensor may be used. In the present embodiment, an explanation is given of the case where the fingerprint/thumbprint sensor 18 is built in the button 3B; however, the embodiments are not limited thereto. For example, the fingerprint/thumbprint sensor 18 may be independently provided on the front face 1A of the housing 20, or the like, within the range that, while the user holds it with one hand, the thumb of said hand may perform an operation.

Figure 4:
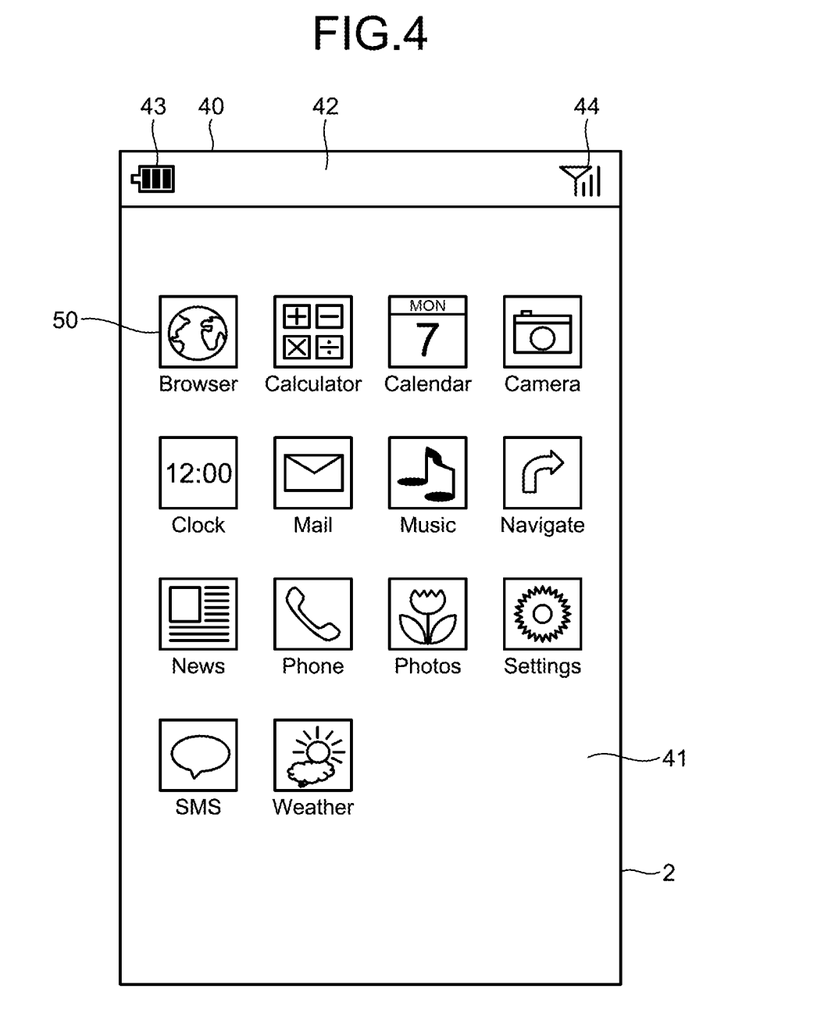
FIG. 4 is a diagram that illustrates an example of a home screen.

With reference to FIG. 4, an explanation is given of an example of the screen that is presented on the display 2A. FIG. 4 illustrates an example of the home screen. The home screen is sometimes called the desktop, the stand-by screen, the idle screen, or the standard screen. The home screen is presented on the display 2A. The home screen is a screen that prompts the user to select an application, included in the applications that are installed in the smartphone 1, to be executed. The smartphone 1 may execute the application, selected on the home screen, in the foreground. The screen of the application, executed in the foreground, may be presented on the display 2A.

In the smartphone 1, icons may be provided on the home screen. Multiple icons 50 are provided on a home screen 40, illustrated in FIG. 4. Each of the icons 50 is previously related to an application that is installed in the smartphone 1. When the gesture for the icon 50 is detected, the smartphone 1 executes the application that is related to the icon 50 for which the gesture has been detected. For example, when the tap for the icon 50, which is related to a mail application, is detected, the smartphone 1 executes the mail application.

The icon 50 includes an image and a character string. Instead of the image, the icon 50 may include a symbol or a graphic. The icon 50 may not include any one of an image and a character string. The icons 50 are arranged based on an arrangement pattern. Behind the icons 50, wallpaper 41 is displayed. The wallpaper 41 is sometimes called a photo screen, a back screen, an idle image, or a background image. In the smartphone 1, any image may be used as the wallpaper 41. The smartphone 1 may be configured such that the user may select the image to be displayed as the wallpaper 41.

The smartphone 1 may include multiple home screens. In the smartphone 1, for example, the number of home screens may be determined in accordance with a setting by the user. Even if there are multiple home screens, the smartphone 1 presents the selected one on the display 2A.

The smartphone 1 may change the home screen that is presented on the display 2A. When a gesture is detected while one of the home screens is displayed, the smartphone 1 may change the home screen, presented on the display 2A, to another home screen. For example, when a right flick is detected, the smartphone 1 may change the home screen, presented on the display 2A, to the home screen provided just on the left. For example, when a left flick is detected, the smartphone 1 may change the home screen, presented on the display 2A, to the home screen provided just on the right. When a gesture is detected while the first home screen is presented on the display 2A, the smartphone 1 may change the home screen, presented on the display 2A, from the first home screen to the second home screen such that the size of the first home screen, presented on the display 2A, gradually becomes smaller and the size of the second home screen, presented on the display 2A, gradually becomes larger. The smartphone 1 may switch the home screen such that the first home screen is promptly replaced with the second home screen.

An area 42 is provided on an upper end of the display 2A. The area 42 presents a remaining-amount mark 43, which indicates the remaining amount of power, and a radio-wave level mark 44, which indicates electric field intensity of radio waves for communications. In the smartphone 1, the area 42 may present the time, the weather, the application being executed, the type of communication system, the status of the phone, the mode of the device, the event that occurs in the device, or the like. Thus, the area 42 is used to make various types of notification to the user. The area 42 is sometimes provided on a screen other than the home screen 40. The position where the area 42 is provided is not limited to the upper end of the display 2A.

A vertical direction of the home screen 40 is explained. In the following explanations, the vertical direction of the home screen 40 is defined by a vertical direction of the text or image presented on the display 2A as a reference. Therefore, with regard to the home screen 40 that is illustrated in FIG. 4, the side that is closer to the area 42 in the longitudinal direction of the touch screen display 2 corresponds to an upper side, and the side that is away from the area 42 corresponds to a lower side. Furthermore, the side where the radio-wave level mark 44 is displayed on the area 42 corresponds to the right side, and the side where the remaining-amount mark 43 is displayed on the area 42 corresponds to the left side.

The home screen 40 illustrated in FIG. 4 is an example, and the forms of various elements, the arrangement of various elements, the number of the home screens 40, the manners of various operations on the home screen 40, or the like, do not need to be as described above.

Figure 5:
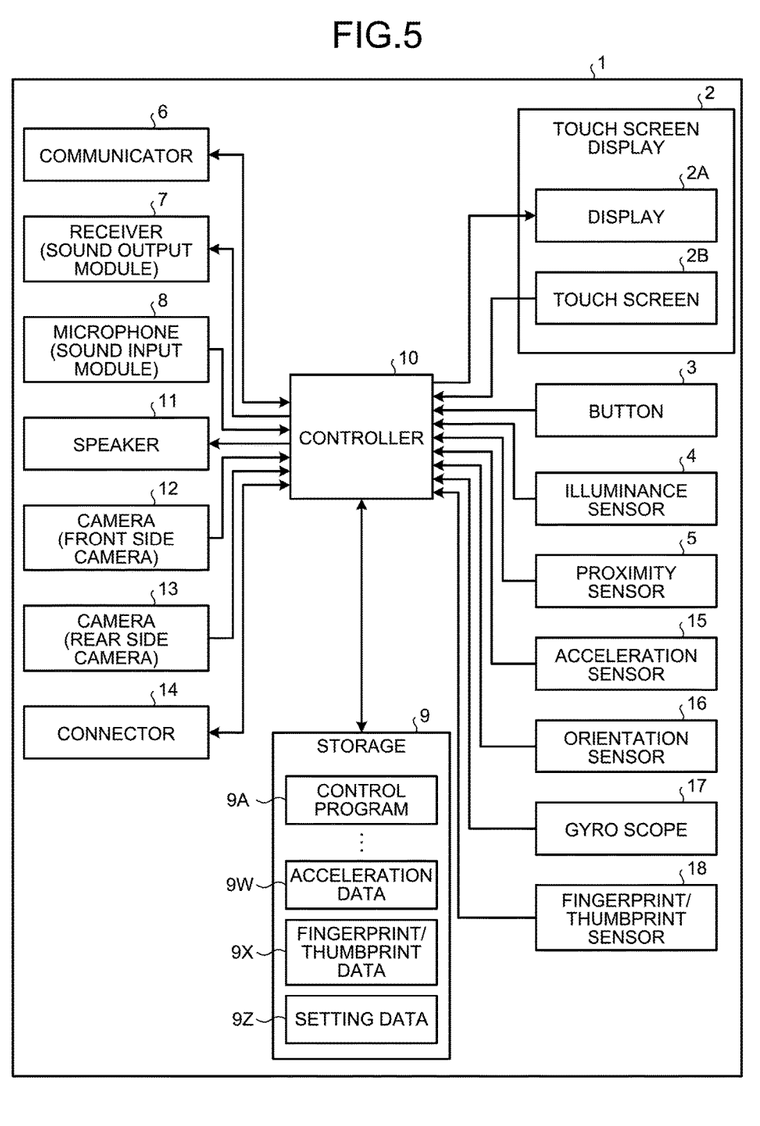
FIG. 5 is a block diagram of the smartphone.

FIG. 5 is a block diagram of the smartphone 1. The smartphone 1 includes the touch screen display 2, the button 3, the illuminance sensor 4, the proximity sensor 5, a communicator 6, the receiver 7, the microphone 8, a storage 9, a controller 10, the speaker 11, the cameras 12 and 13, the connector 14, an acceleration sensor 15, an orientation sensor 16, a gyro scope 17, and the fingerprint/thumbprint sensor 18.

As described above, the touch screen display 2 includes the display 2A and the touch screen 2B. The display 2A presents texts, images, symbols, graphics, or the like. The touch screen 2B detects contact. The controller 10 detects a gesture on the smartphone 1. Specifically, the controller 10 detects an operation (gesture) on the touch screen 2B (the touch screen display 2) in cooperation with the touch screen 2B.

The button 3 is operated by the user. The button 3 includes the button 3A to the button 3F. The controller 10 detects an operation on the button 3 in cooperation with the button 3. Examples of the operation on the button 3 include, but are not limited to, click, double click, triple click, push, etc.

The buttons 3A to 3C are for example a home button, a back button, or a menu button. The button 3D is for example a power on/off button of the smartphone 1. The button 3D may be also used as a sleep/sleep-cancel button. The buttons 3E and 3F are for example sound volume buttons.

The illuminance sensor 4 detects illuminance of surrounding light of the smartphone 1. The illuminance is a value of light flux that enters a unit area of the measurement surface of the illuminance sensor 4. The illuminance sensor 4 is used to, for example, adjust the brightness of the display 2A. The proximity sensor 5 detects presence of an object in the neighborhood in a non-contact manner. The proximity sensor 5 detects presence of an object based on a change in the magnetic field, a change in a return time of a reflected wave of an ultrasonic wave, or the like. The proximity sensor 5 detects that, for example, the touch screen display 2 is brought close to the face. The illuminance sensor 4 and the proximity sensor 5 may be configured as a single sensor. The illuminance sensor 4 may be used as a proximity sensor.

The communicator 6 performs communication via radio waves. The communication system, supported by the communicator 6, is a wireless communication standard. Examples of the wireless communication standard include, but are not limited to, the communication standard for cellular phones, such as 2G, 3G, 4G, etc. Examples of the communication standard for cellular phones include, but are not limited to, LTE (Long Term Evolution), W-CDMA (Wideband Code Division Multiple Access), CDMA2000, PDC (Personal Digital Cellular), GSM (registered trademark) (Global System for Mobile Communications), PHS (Personal Handy-phone System), etc. Examples of the wireless communication standard include, but are not limited to, WiMAX (Worldwide Interoperability for Microwave Access), IEEE802.11, Bluetooth (registered trademark), IrDA (Infrared Data Association), NFC (Near Field Communication), etc. The communicator 6 may support one or more of the above-described communication standards.

The receiver 7 and the speaker 11 are sound output modules. The receiver 7 and the speaker 11 output sound signals, transmitted from the controller 10, as sounds. The receiver 7 is used to, for example, output a voice of a partner during a phone call. The speaker 11 is used to, for example, output a ring tone and music. One of the receiver 7 and the speaker 11 may perform a function of the other. The microphone 8 is a sound input module. The microphone 8 converts a voice of the user, or the like, into a sound signal and transmits the sound signal to the controller 10.

The storage 9 stores programs and data. The storage 9 is also used as a work area that temporarily stores processing results of the controller 10. The storage 9 may include any non-transitory storage medium, such as a semiconductor storage medium or a magnetic storage medium. The storage 9 may include multiple types of storage media. The storage 9 may include a combination of a portable storage medium, such as a memory card, an optical disk, or a magnetic optical disk, and a reading device for the storage medium. The storage 9 may include a storage device that is used as a temporary memory area, such as a RAM (Random Access Memory).

The programs stored in the storage 9 include an application executed in the foreground or the background and a control program that supports execution of the application. For example, the application causes the display 2A to present the screen and causes the controller 10 to perform the operation that corresponds to the gesture that is detected through the touch screen 2B. The control program is for example the OS. The application and the control program may be installed in the storage 9 through a wireless communication by the communicator 6 or through a non-transitory storage medium.

The storage 9 stores for example a control program 9A, acceleration data 9W, fingerprint/thumbprint data 9X, and setting data 9Z. The acceleration data 9W includes information related to acceleration that acts on the smartphone 1. The fingerprint/thumbprint data 9X includes information related to the fingerprint/thumbprint that is registered by the user who owns the smartphone 1. The setting data 9Z includes information related to various settings about operations of the smartphone 1.

The control program 9A is capable of providing functions related to various controls for operating the smartphone 1. The control program 9A controls, for example, the communicator 6, the receiver 7, the microphone 8, and the like, to make a phone call. The functions provided by the control program 9A include functions that perform various controls, such as changing the information, presented on the display 2A, in accordance with the gesture that is detected via the touch screen 2B. The function provided by the control program 9A may be used in combination with a function that is provided by a different program.

The control program 9A is capable of providing a function to put a limitation of operations on the touch screen display 2, the button 3, or the like. The control program 9A performs a control so as to present a lock screen on the display 2A and receive only an operation to cancel the limitation of operations, thereby performing the function to put the limitation of operations. The lock screen is described later. The control program 9A starts the limitation of operations, for example, when the power of the smartphone 1 is turned off, or when the smartphone 1 is not in operation during a predetermined time.

The control program 9A is capable of providing an authentication function to authenticate a user. Examples of the authentication function include, but are not limited to, authentication by a fingerprint/thumbprint of a user, authentication by input of a passcode, etc. As for the authentication by the fingerprint/thumbprint, when the fingerprint/thumbprint information read by the fingerprint/thumbprint sensor 18 matches the previously registered fingerprint/thumbprint information at a predetermined degree, the user is authenticated as the registered person. A match at a predetermined degree means that, for example, the matching property is evaluated through image processing on the read fingerprint/thumbprint image and the previously registered thumb fingerprint/thumbprint image and, when it is more than a predetermined evaluation, they are determined to be matched. Examples of the image processing include, but are not limited to, a process to extract a feature point of the fingerprint/thumbprint and compare it, etc. As for the authentication by the input of the passcode, when the input passcode matches the previously registered passcode, the user is authenticated as the registered person.

The control program 9A is capable of providing a function to authenticate the user based on the fingerprint/thumbprint information when the fingerprint/thumbprint sensor 18 outputs the fingerprint/thumbprint information during the limitation of operations. For example, when the fingerprint/thumbprint information read by the fingerprint/thumbprint sensor 18 matches the previously registered fingerprint/thumbprint information at a predetermined degree, the control program 9A determines that the user is the registered user and performs a control so as to cancel the limitation of operations, thereby performing the authentication function. After the limitation of operations is canceled, a state is obtained in which operations on the touch screen display 2, the button 3, or the like, are possible, and the user can use the functions of the smartphone 1.

For the acceleration data 9W, multiple pieces of acceleration information, transmitted as detection results of the acceleration sensor 15, are stored in time series. The acceleration information includes items, such as a time or an acceleration value. The time indicates a time at which the acceleration sensor 15 detects the acceleration. The acceleration value indicates a value of the acceleration that is detected by the acceleration sensor 15.

The fingerprint/thumbprint data 9X includes the fingerprint/thumbprint information that indicates the fingerprint/thumbprint image that is previously registered by the user. When multiple fingerprints of fingers and a thumbprint of a thumb are registered, the fingerprint/thumbprint data 9X includes the fingerprint/thumbprint information on each of the fingers and the thumb. For example, when the thumbprint of the thumb and the fingerprint of the index finger are registered, the fingerprint/thumbprint data 9X includes two pieces of fingerprint/thumbprint information that correspond to the thumb and the index finger. In the fingerprint/thumbprint data 9X, the fingerprint/thumbprint information is associated with the information that indicates the types of a thumb, fingers and hands. For example, when the thumbprint of the thumb of the right hand is registered, the fingerprint/thumbprint information in the fingerprint/thumbprint data 9X is associated with the information that indicates the right hand and the thumb.

The controller 10 is an arithmetic processing device. Examples of the arithmetic processing device include, but are not limited to, a CPU (Central Processing Unit), a SoC (System-on-a-chip), an MCU (Micro Control Unit), a FPGA (Field-Programmable Gate Array), a coprocessor, etc. The controller 10 may include multiple arithmetic processing devices. The controller 10 may integrally control operations of the smartphone 1 in cooperation with various devices. Various functions of the controller 10 may be implemented based on the control of the controller 10.

Specifically, the controller 10 may execute commands included in programs that are stored in the storage 9. The controller 10 may refer to data that is stored in the storage 9 as needed. The controller 10 controls functional modules in accordance with data and commands. The controller 10 controls functional modules to implement various functions. Examples of the functional module include, but are not limited to, the display 2A, the communicator 6, the receiver 7, the speaker 11, etc. The controller 10 sometimes changes control based on a detection result of a detector. Examples of the detector include, but are not limited to, the touch screen 2B, the button 3, the illuminance sensor 4, the proximity sensor 5, the microphone 8, the camera 12, the camera 13, the acceleration sensor 15, the orientation sensor 16, the gyro scope 17, the fingerprint/thumbprint sensor 18, etc.

The controller 10 executes for example the control program 9A so as to perform various types of control, such as changing the information that is presented on the display 2A, in accordance with the gesture that is detected via the touch screen 2B.

The camera 12 is a front side camera that takes an image of the object that is opposed to the front face 1A. The camera 13 is a rear side camera that takes an image of the object that is opposed to the rear face 1B.

The connector 14 is a terminal that is connected to a different device. The connector 14 may be a general-purpose terminal, such as a USB (Universal Serial Bus), HDMI (registered trademark) (High-Definition Multimedia Interface), Light Peak (Thunderbolt (registered trademark)), or an earphone/microphone connector. The connector 14 may be a dedicated terminal, such as a Dock connector. Examples of the device that is connected to the connector 14 include, but are not limited to, an external storage, a speaker, a communication device, etc.

The acceleration sensor 15 is capable of detecting a direction and level of acceleration that acts on the smartphone 1, an angle of inclination of the smartphone 1, and a direction and level of acceleration due to gravity. The orientation sensor 16 is capable of detecting a direction of geomagnetism. The gyro scope 17 detects an angle and an angular velocity of the smartphone 1. Detection results of the acceleration sensor 15, the orientation sensor 16, and the gyro scope 17 are used in combination to detect changes in a position, an attitude, and a status of the smartphone 1.

All or some of the programs and data, stored in the storage 9 in FIG. 5, may be downloaded from a different device through a wireless communication by the communicator 6. All or some of the programs and data, stored in the storage 9 in FIG. 5, may be stored in a non-transitory storage medium that is readable by a reading device included in the storage 9. All or some of the programs and data, stored in the storage 9 in FIG. 5, may be stored in a non-transitory storage medium that is readable by a reading device that is connected to the connector 14. Examples of the non-transitory storage medium include, an optical disk, such as CD (registered trademark), DVD (registered trademark), or Blu-ray (registered trademark), a magneto-optical disk, a magnetic storage medium, a memory card, a solid-state storage medium, etc.

The configuration of the smartphone 1, illustrated in FIG. 5, is an example, and modifications may be appropriately made to such a degree that the scope of the subject application is not degraded. For example, the number and the type of the button 3 are not limited to the example in FIG. 5. As the buttons for operations related to the screen, the smartphone 1 may include buttons in the numeric keypad arrangement, QWERTY arrangement, or the like, instead of the buttons 3A to 3C. The smartphone 1 may include only one button or include no buttons for operations related to the screen. In the example that is illustrated in FIG. 5, the smartphone 1 includes two cameras; however, the smartphone 1 may include only one camera or may include no cameras. In the example that is illustrated in FIG. 5, the smartphone 1 includes four types of sensors to detect the position and the attitude; however, the smartphone 1 does not need to include any of the sensors. Alternatively, the smartphone 1 may include a different type of sensor to detect at least one of the position and the attitude.

Figure 6:
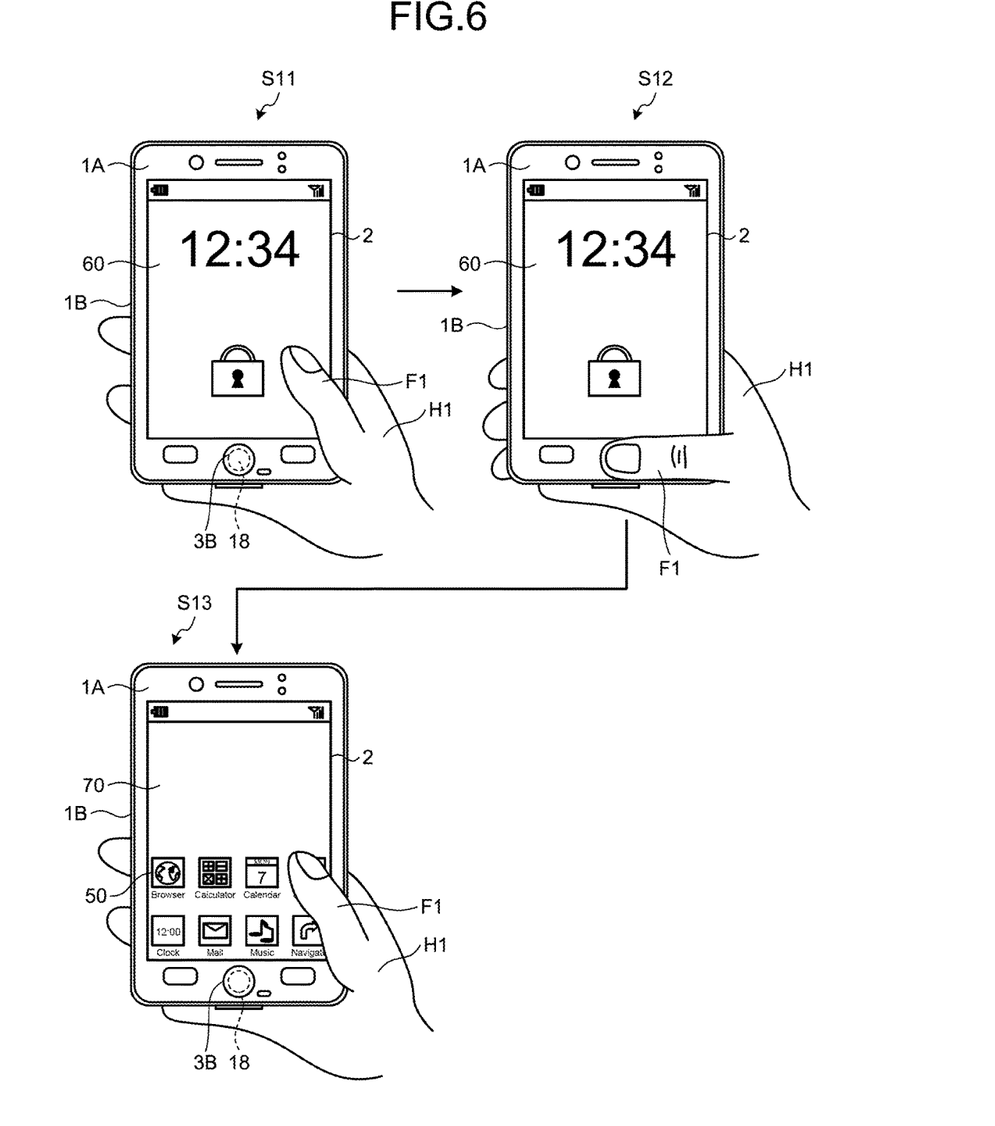
FIG. 6 is a diagram that illustrates an example of the control related to cancellation of limitation of operations by the smartphone.

FIG. 6 is a diagram that illustrates an example of control related to cancellation of the limitation of operations by the smartphone 1. In the following explanation, the same components are attached with the same reference numerals, and duplicated explanations are sometimes omitted.

At Step S11, illustrated in FIG. 6, the previously registered user holds the smartphone 1 with a right hand (one hand) H1. The size of the touch screen display 2 is such a size that the user has difficulty in operating it with only a thumb F1 of one hand. At Step S11, the smartphone 1 presents a lock screen 60 on the touch screen display 2 (the display 2A) and also put a limitation of user's operations. The lock screen 60 is a screen that indicates that there is a limitation on operations on, for example, the touch screen display 2 or the button 3. The control to limit the operations may be such that the controller 10 does not receive the operations on the touch screen display 2 or such that the controller 10 ignores the operations on the touch screen display 2 even when they are received. Some of the operations on the touch screen display 2 or the button 3 may be refrained from being restricted. According to the example illustrated in FIG. 6, an explanation is given of the case where the lock screen 60 presents information for indicating a clock and a key; however, the embodiments are not limited thereto.

At Step S12, the user has brought the thumb F1 into contact with the button 3B, which has the built-in fingerprint/thumbprint sensor 18, to cancel the limitation of operations on the smartphone 1. Generally, when the operation to cancel the limitation of operations on the smartphone 1 is performed with a finger other than the thumb F1, there is a great variety on how the user operates the smartphone 1 after the limitation of operations on the smartphone 1 is cancelled. Conversely, as illustrated in FIG. 6, when the user holds the smartphone 1 with only the right hand H1 and tries to operate it while viewing the touch screen display 2, the thumb F1 is located at a side of the front face 1A, and the fingers other than the thumb F1 are located at a side of the rear face 1B. In this case, there is a high possibility that the user uses the thumb F1 of the right hand H1 to perform the operation to cancel the limitation of operations on the smartphone 1 by the fingerprint/thumbprint sensor 18, which is located at the side of the front face 1A. When the operation to cancel the limitation of operations is performed with one hand (the right hand H1), there is a possibility that, after the limitation of operations on the smartphone 1 is cancelled, the user holds it with one hand (the right hand H1) and operates it with the thumb F1. Therefore, how to use the smartphone 1 by the user may be estimated on whether the operation to cancel the limitation of operations is performed with the thumb F1 or not. Thus, the smartphone 1 determines whether the operation to cancel the limitation of operations is performed with the thumb F1.

At Step S12, the smartphone 1 reads the fingerprint/thumbprint information on the user with the fingerprint/thumbprint sensor 18 and then conducts the fingerprint/thumbprint authentication on the read fingerprint/thumbprint information. Specifically, the smartphone 1 determines whether the read fingerprint/thumbprint information matches the thumbprint information, registered in the fingerprint/thumbprint data 9X, at a predetermined degree. When the read fingerprint/thumbprint information matches the registered thumbprint information at a predetermined degree, the smartphone 1 determines that the operation to cancel the limitation of operations is an operation with the thumb F1.

When it is determined to be an operation with the thumb F1, the smartphone 1 cancels the limitation of operations and presents a screen 70 for a one hand on the display 2A at Step S13. Specifically, the smartphone 1 specifies a top and a bottom of the display direction of the display 2A based on a detection result of the gyro scope 17. When the top and the bottom in the display direction of the display 2A are in a longitudinal direction of the display 2A, the fingerprint/thumbprint sensor 18 is located on the front face 1A on the lower side of the display 2A. When the user conducts the cancellation on the limitation of operations with the thumb F1 of the right hand H1, there is a high possibility that the thumb F1 of the right hand H1 is located on the lower side of the touch screen display 2. Therefore, the movable range of the thumb F1 of the right hand H1 is likely to be in a lower part of the display 2A. The smartphone 1 specifies the top and the bottom of the display direction of the display 2A, thereby estimating the position and the operable range of the thumb F1.

The screen 70 for one hand is a screen that is operable with only the thumb F1 of one hand that holds the smartphone 1. The screen 70 for one hand displays part of the home screen 40, and it is a screen different from the home screen 40. According to the example illustrated in FIG. 6, the screen 70 for one hand is a screen where the icons 50 of the home screen 40 are slid downward in the display direction (the longitudinal direction) of the display 2A. Specifically, the screen 70 for one hand is a screen where the icons 50, which are located in two rows and four columns on the upper side of the home screen 40, are arranged in the operable range of the thumb F1 on the display 2A. The screen 70 for one hand is configured to be scrollable to up and down or to right and left in the display direction of the display 2A within the operable range of the thumb F1 on the display 2A.

In the present embodiment, an explanation is given of the case where the screen 70 for one hand is a screen where the home screen 40 is slid; however, the embodiments are not limited thereto. Examples of the screen 70 for one hand include, but are not limited to, the screen that displays some of the icons 50, that are determined under a predetermined condition, of the icons 50 on the home screen 40 and that are displayed concentrated in the area that is located on the lower side of the touch screen display 2, etc. The predetermined condition may be for example a condition that is updated when the operation to cancel the limitation of operations for the icons for the frequently executed applications or recently executed applications is performed, or it may be a predetermined condition that is allocated to a specific icon and that becomes available when the operation to cancel the limitation of operations for the specific icon is performed. Furthermore, the screen 70 for one hand includes a screen where a reduced-size screen of the home screen 40 is arranged on the lower side of the touch screen display 2.

In the present embodiment, an explanation is given of the case where the smartphone 1 presents the screen 70 for one hand on the lower side area of the display 2A and presents nothing on the upper side area of the display 2A; however, the embodiments are not limited thereto. The smartphone 1 may display, for example, the screen that presents time and date, the screen that notifies information, or the like, on the upper side area of the display 2A.

At Step S13, the user touches the icon 50 on the screen for one hand 70 with the thumb F1. When the gesture of touch on the icon 50 is detected via the touch screen 2B, the smartphone 1 executes the application that corresponds to the icon 50.

In this manner, when the operation to cancel the limitation of operations with the thumb F1 of the user is detected, the smartphone 1 predicts a situation of operation by the user with one hand and presents the screen for one hand 70 on the touch screen display 2. Thus, the smartphone 1 does not require a sequence of operations to switch user interface thereof into that for one hand operation after the operation for cancelling the limitation of operations. As a result, the smartphone 1 may improve user convenience for operation with one hand.

As the smartphone 1 presents the screen for one hand 70, where the home screen 40 is slid downward, the home screen 40 may be also used as the screen for one hand 70. As a result, the smartphone 1 only has to switch a display mode of the single home screen in accordance with the type of a thumb or a finger that performs the operation to cancel the limitation of operations, and thus the control may be simplified.

Figure 7:
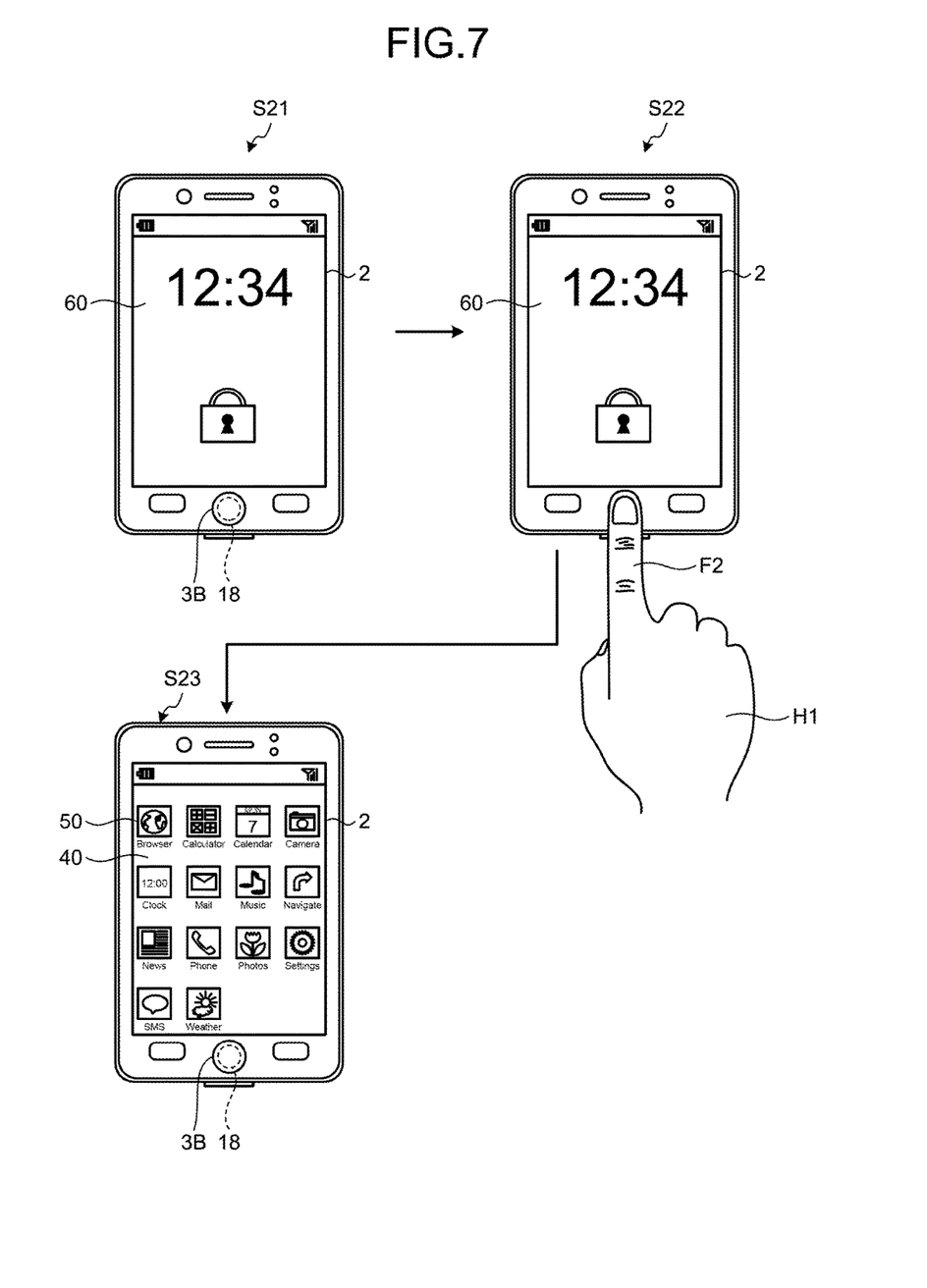
FIG. 7 is a diagram that illustrates another example of the control related to cancellation of limitation of operations by the smartphone.

FIG. 7 is a diagram that illustrates another example of the control related to cancellation on the limitation of operations by the smartphone 1.

At Step S21, illustrated in FIG. 7, the user puts the smartphone 1 on the desk, table, or the like, or holds it with the left hand. At Step S21, the smartphone 1 presents the lock screen 60 on the touch screen display 2 (the display 2A) and limits user's operations.

Generally, when the smartphone 1 is placed on the desk, table, or the like, when the smartphone 1 is held with hand that is different from the operating hand, or the like, there is a high possibility that the user performs the operation to cancel the limitation of operations with a finger rather than a thumb. Therefore, the smartphone 1 determines whether the operation to cancel the limitation of operations is performed with a finger rather than a thumb. At Step S22, the user has brought an index finger F2 of the right hand H1 into contact with the button 3B that has the built-in fingerprint/thumbprint sensor 18 to cancel the limitation of operations on the smartphone 1.

At Step S22, the smartphone 1 reads the fingerprint/thumbprint information on the user with the fingerprint/thumbprint sensor 18 and then conducts the fingerprint/thumbprint authentication on the read fingerprint/thumbprint information. Specifically, the smartphone 1 determines whether the read fingerprint/thumbprint information matches the thumbprint information registered in the fingerprint/thumbprint data 9X at a predetermined degree. When the read fingerprint/thumbprint information is not matched at the predetermined degree, the smartphone 1 determines whether the read fingerprint/thumbprint information matches the registered fingerprint information at a predetermined degree. When the read fingerprint/thumbprint information matches the registered fingerprint information at the predetermined degree, the smartphone 1 determines that the operation to cancel the limitation of operations is performed with a finger rather than a thumb.

When it is determined that the operation is performed with a finger, the smartphone 1 cancels the limitation of operations and presents the home screen 40 on the display 2A at Step S23. For example, when the gesture of touch on the icon 50 is detected via the touch screen 2B, the smartphone 1 executes the application that corresponds to the icon 50.

In this manner, when the operation to cancel the limitation of operations is performed with a user's finger rather than a thumb, the smartphone 1 presents not the screen for one hand 70 but the home screen 40 on the touch screen display 2. Thus, the smartphone 1 may automatically switch the user interface in accordance with the type of a thumb or a finger for the operation to cancel the limitation of operations. As a result, when the limitation of operations is cancelled, the smartphone 1 may improve user convenience for switching the user interface.

Figure 8:
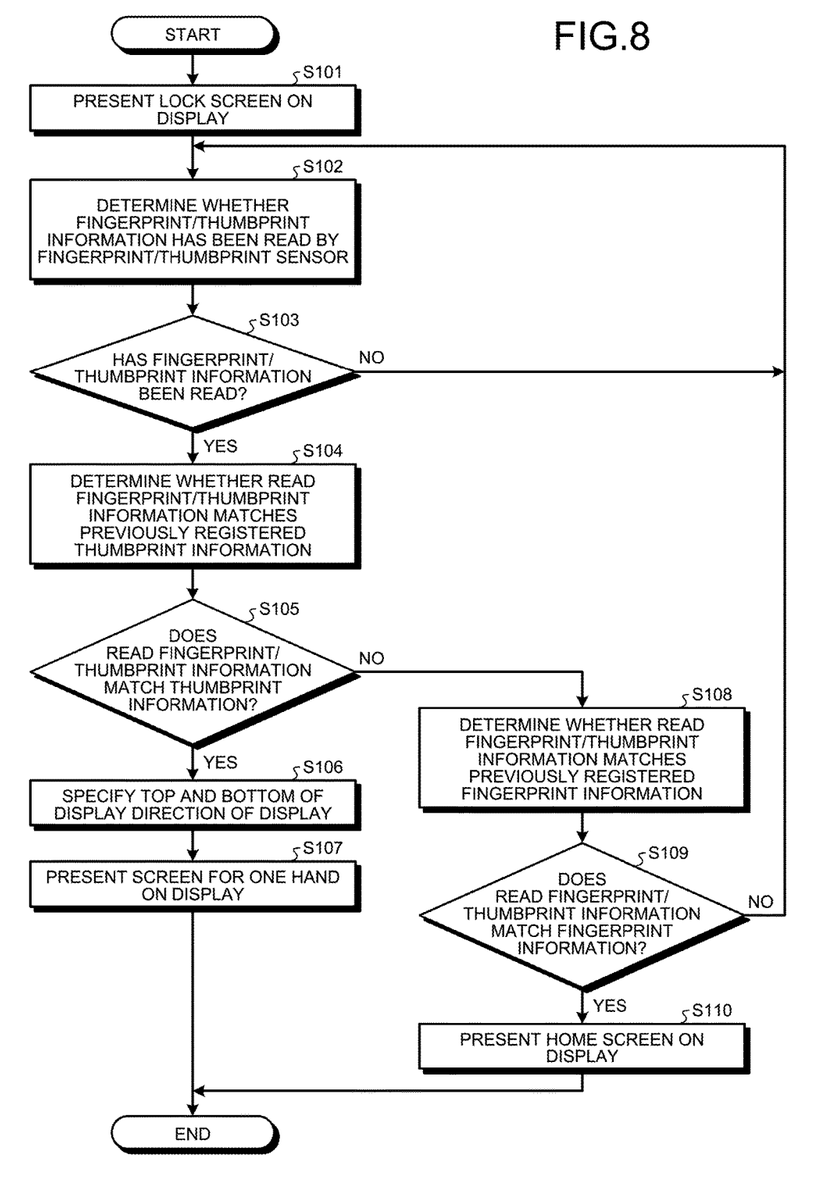
FIG. 8 is a flowchart that illustrates an example of procedure for control by using the smartphone.

FIG. 8 is a flowchart that illustrates an example of procedure for control by the smartphone 1. The procedure, illustrated in FIG. 8, is performed when the controller 10 executes the control program 9A. The procedure, illustrated in FIG. 8, is performed when the operations of the smartphone 1 is limited.

As illustrated in FIG. 8, the controller 10 of the smartphone 1 presents the lock screen 60 on the display 2A at Step S101. At Step S102, the controller 10 determines whether the fingerprint/thumbprint information has been read by the fingerprint/thumbprint sensor 18. When reading of the fingerprint/thumbprint information by the fingerprint/thumbprint sensor 18 has succeeded, the controller 10 determines that the fingerprint/thumbprint information has been read. When the fingerprint/thumbprint information has not been read (Step S103, No), the controller 10 performs the processes after Step S102 again.

When the fingerprint/thumbprint information has been read (Step S103, Yes), the controller 10 proceeds to Step S104. At Step S104, the controller 10 determines whether the read fingerprint/thumbprint information matches the previously registered thumbprint information. Specifically, the controller 10 compares the feature points in the read fingerprint/thumbprint information and the thumbprint information registered in the fingerprint/thumbprint data 9X, and when the feature points are matched at a predetermined degree, determines that the read fingerprint/thumbprint information matches the thumbprint information.

When the read fingerprint/thumbprint information matches the thumbprint information (Step S105, Yes), the controller 10 proceeds to Step S106. At Step S106, the controller 10 specifies the top and the bottom of the display direction of the display 2A. Specifically, based on a detection result of the gyro scope 17, when the longitudinal direction of the display 2A is in the direction of gravity, the controller 10 specifies that the side near the fingerprint/thumbprint sensor 18 in the longitudinal direction of the display 2A is the lower side. At Step S107, the controller 10 presents the screen for one hand 70 on the display 2A. Then, the controller 10 terminates the procedure illustrated in FIG. 8.

When the read fingerprint/thumbprint information does not match the thumbprint information (Step S105, No), the controller 10 proceeds to Step S108. At Step S108, the controller 10 determines whether the read fingerprint/thumbprint information matches the previously registered fingerprint information. Specifically, the controller 10 compares the feature points in the read fingerprint/thumbprint information and in the fingerprint information registered in the fingerprint/thumbprint data 9X, and when the feature points are matched at a predetermined degree, determines that the read fingerprint/thumbprint information matches the fingerprint information. When the feature points are not matched at a predetermined degree, the controller 10 determines that the read fingerprint/thumbprint information also does not match the fingerprint information.

When the read fingerprint/thumbprint information matches the fingerprint information (Step S109, Yes), the controller 10 proceeds to Step S110. At Step S110, the controller 10 presents the home screen 40 on the display 2A. Then, the controller 10 terminates the procedure illustrated in FIG. 8.

When the read fingerprint/thumbprint information does not match the fingerprint information (Step S109, No), the read fingerprint/thumbprint information is not the fingerprint/thumbprint information registered in the fingerprint/thumbprint data 9X and therefore the controller 10 executes the processes after Step S102 again.

An explanation is given of the case where, in the above-described procedure illustrated in FIG. 8, when the fingerprint information is not matched, the controller 10 returns to Step S102; however, the embodiments are not limited thereto. For example, in the procedure illustrated in FIG. 8, a configuration may be such that, after the information indicating that the authentication ends in failure is presented on the display 2A, Step S102 is returned.

An explanation is given of the case where, in the above-described procedure illustrated in FIG. 8, the controller 10 specifies the top and the bottom of the display direction of the display 2A; however, the embodiments are not limited thereto. For example, in the procedure illustrated in FIG. 8, a configuration may be such that, without specifying the top and the bottom of the display direction of the display 2A, the screen for one hand 70 is presented on the lower side of the display 2A.

Embodiments disclosed in the present application may be modified without departing from the spirit and scope of the present application. Furthermore, embodiments disclosed in the present application may be combined as appropriate. For example, embodiments may be modified as described below.

For example, each program, illustrated in FIG. 5, may be divided into multiple modules, or it may be combined with a different program.

An explanation is below given of another example of the smartphone 1 according to embodiments. The smartphone 1 according to another example has the same configuration as that of the smartphone 1, illustrated in FIG. 5, except for that the function of the control program 9A is different.

The control program 9A is capable of providing a function to determine a state of the smartphone 1 based on a detection result of the acceleration sensor 15. Examples of the state of the smartphone 1 include, but are not limited to, walking state, running state, holding state, etc. The walking state is a state where the user who carries the smartphone is walking. The running state is a state where the user who carries the smartphone is running. The holding state is a state where the user holds the smartphone with his/her hand.

The smartphone 1 uses the acceleration sensor 15 to acquire a pattern, such as frequency and amplitude, of the oscillation in a state where the user holds the smartphone 1 with his/her hand. The controller 10 executes the control program 9A to perform controls so as to analyze the frequency, the amplitude, or the like, of the oscillation that is detected by the acceleration sensor 15 and to determine the state of the smartphone 1. For example, the controller 10 uses data of acceleration patterns that correspond to various states of the smartphone 1 to determine the state thereof. For example, the acceleration pattern is previously stored as determination data in the storage 9. The controller 10 compares the acceleration data 9W which indicates the detection result acquired from the acceleration sensor 15 and the acceleration pattern, and determines that the state that corresponds to the matched acceleration pattern is the state of the smartphone 1. The matched pattern includes a completely matched pattern and a matched pattern with a predetermined percentage. The controller 10 stores the determined state of the smartphone in the storage 9.

An explanation is given below of the case where the smartphone 1 uses the acceleration sensor 15 as a motion sensor; however, the embodiments are not limited thereto. The smartphone 1 may use for example the gyro scope 17, the orientation sensor 16, the proximity sensor 5, an atmospheric pressure sensor, an infrared-ray motion sensor, or the like, as the motion sensor, or uses various sensors in combination.

The smartphone 1 determines whether the smartphone is in a state of being held by the user with his/her hand based on a detection result of the motion sensor. When the smartphone is in a state of being held by the user with his/her hand and when the operation to cancel the limitation of operations is performed with the thumb, the smartphone 1 presents a screen for one hand 70 which is different from the home screen 40 on the display 2A.

When the smartphone is not in a state of being held by the user with his/her hand and when the operation to cancel the limitation of operations is performed with the thumb, the smartphone 1 presents the home screen 40 on the display 2A.

In this way, by determining whether the operation to cancel the limitation of operations is performed with the thumb when the user holds the smartphone with his/her hand, accuracy of the determination of operation with the thumb may be improved. As a result, when the limitation of operations is cancelled, the smartphone 1 may improve the accuracy of automatically switching of user interface into suitable one corresponding to a state of the user.

Figure 9:
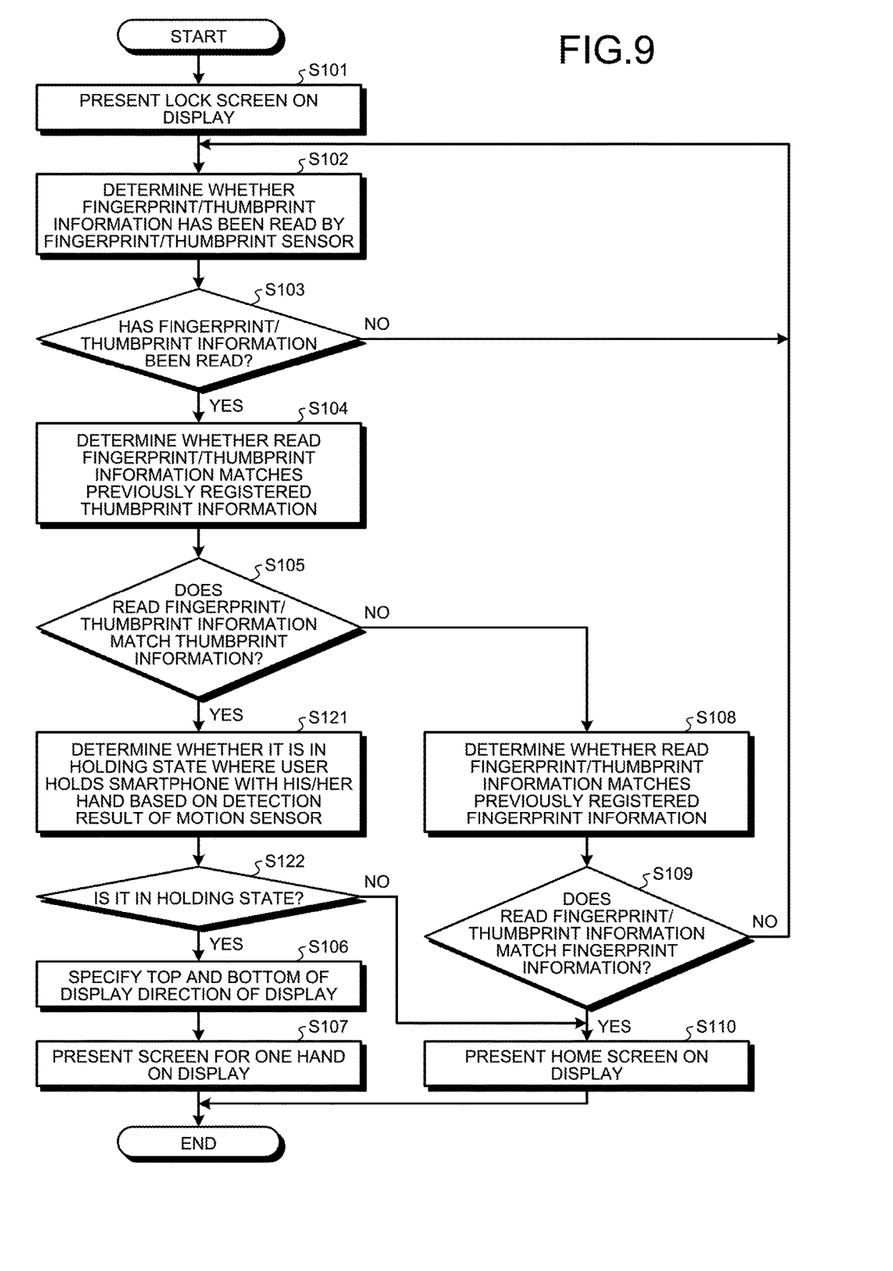
FIG. 9 is a flowchart that illustrates another example of procedure for control by using the smartphone.

FIG. 9 is a flowchart that illustrates another example of the procedure for the control by the smartphone 1. The procedure illustrated in FIG. 9 is implemented when the controller 10 executes the control program 9A. The procedure illustrated in FIG. 9 is executed when operations on the smartphone 1 are limited.

In the example illustrated in FIG. 9, the operations from Step S101 to Step S110 are the same as the operations from Step S101 to Step S110 illustrated in FIG. 8; therefore, only different parts are explained, and explanations for the same parts are omitted.

As illustrated in FIG. 9, the controller 10 performs the operations from Step S101 to Step S104 which have been already explained. When the read fingerprint/thumbprint information matches the thumbprint information (Step S105, Yes), the controller 10 proceeds to Step S121. At Step S121, the controller 10 determines whether it is in a holding state where the user holds the smartphone with his/her hand based on a detection result of the motion sensor.

When it is in the holding state (Step S122, Yes), the controller 10 performs the operations at Step S106 and Step S107 which have been already explained. Then, the controller 10 terminates the procedure illustrated in FIG. 9.

When it is not in the holding state (Step S122, No), the controller 10 performs the operation at Step S110 which has been already explained. Then, the controller 10 terminates the procedure illustrated in FIG. 9.

An explanation is given of the case where, in the above-described procedure illustrated in FIG. 9, when the read fingerprint/thumbprint information matches the thumbprint information, it is determined whether the smartphone is in the holding state; however, the embodiments are not limited thereto. For example, in the procedure, it may be determined whether the read fingerprint/thumbprint information matches the thumbprint information after it is determined that the smartphone is in the holding state.

According to embodiments, an explanation is given of the case where it is assumed that the smartphone 1 previously registers the fingerprint/thumbprint information of the fingers and the thumb in the fingerprint/thumbprint data 9X; however, the embodiments are not limited thereto. For example, the smartphone 1 may previously register only the thumbprint information in the fingerprint/thumbprint data 9X. Generally, when the authentication is conducted with using one hand, there is a high possibility that the thumbprint is read in a state where the tip of the thumb is oriented in the width direction of the display 2A. When the authentication is conducted with using both hands, there is a high possibility that the thumbprint is read in a state where the tip of the thumb is oriented in the longitudinal direction of the display 2A. In such a case, a configuration may be such that the smartphone 1 specifies the orientation of the thumb based on the read fingerprint/thumbprint information and performs control so as to switch the user interface in accordance with the orientation of the thumb.

According to embodiments, in the smartphone 1, the lower side of the display 2A is provided with an area that is scrollable in a lateral direction, and the icons 50 on the home screen 40 may be arranged and displayed within the area.

According to embodiments, an explanation is given of the case where the smartphone 1 presents the home screen 40 as a first screen; however, the embodiments are not limited thereto. For example, the smartphone 1 may use, as the first screen, the screen that is different from the home screen 40 and that is displayed when the limitation of operations is started. In this case, the smartphone 1 may use the predetermined screen for one hand as a second screen.

According to embodiments, an explanation is given of the case where the smartphone 1 determines whether the operation to cancel the limitation of operations is performed with the thumb based on the fingerprint/thumbprint of the user; however, the embodiments are not limited thereto. For example, when the authentication is conducted by using input of a passcode, the smartphone 1 may determine whether the operation is performed with the thumb based on the contact area, or the like, of the fingertip that inputs the passcode.

According to embodiments, the smartphone is explained as an example of the electronic device; however, the electronic device according to the attached claims is not limited to the smartphone. The electronic device according to the attached claims may be an electronic device other than the smartphone. Examples of the electronic device include, but are not limited to, a mobile phone, a tablet, a portable personal computer, a digital camera, a media player, an electronic book reader, a navigator, a game machine, etc.

In this application, description of "when", "during", "if", "in a case", "upon", "in response to determining", "in response to detecting" may be understood as another description depending on circumstances. In this application, description of "when 'a stated condition or event' is determined", "when 'a stated condition or event' is detected", or "upon determining 'a stated condition or event'", and description of "in response to determining", "upon detecting", or "in response to detecting" may be understood as another description depending on circumstances. In this application, description of "detect" may be understood as meaning of "measure", "scale", and "sense" depending on circumstances. In this application, description of "state" may be understood as "situation" depending on circumstances. For example, a moving state may be understood as a moving situation. A state of an electronic device may be understood as a situation of an electronic device.

Characteristic embodiments have been described to disclose the technology according to the attached claims fully and clearly. However, the attached claims do not need to be limited to embodiments, and they need to be configured so as to implement all modifications and alternative configurations that may be created by a person skilled in the art within the range of fundamental matters that are described in this specification.

The invention claimed is:

1. An electronic device comprising:
a display;
a user interface;
a motion sensor; and
at least one controller that is configured to,
  display a lock screen on the display;
  detect a user touch operation on the user interface to cancel limitation of operations of the electronic device;
  when the detected user touch is a registered finger touch, then display a first screen on the display in place of the lock screen; and
  when the detected user touch is a registered thumb touch, then
    determine a state of the electronic device based on an output of the motion sensor; and
    when the determined state is a state of being held, then display a second screen, which is different from the first screen, in place of the lock screen.

2. The electronic device according to claim 1, wherein the user interface is a fingerprint/thumbprint sensor, wherein
the at least one controller is further configured to determine that the registered thumb touch matches previously registered thumbprint information, wherein the registered thumb touch is positioned at a predetermined degree with respect to a top/bottom display direction of the electronic device.

3. The electronic device according to claim 1, wherein the second screen is operable by one hand associated with the detected registered thumb touch.

4. The electronic device according to claim 3, wherein the at least one controller is further configured to
specify a top and a bottom of a display direction of the display, and
wherein the second screen that is operable by the one hand comprises selectable icons that are positioned at the bottom of the display direction, and no icons positioned at the top of the display direction.

5. The electronic device according to claim 4, wherein
the selectable icons displayed on the second screen are a part of first screen icons displayed on the first screen, and
the selectable icons displayed on the second screen are located in a reachable range of a thumb of the one hand.

6. The electronic device according to claim 1, comprising:
when the detected user touch is a registered thumb touch, and the determined state is a not-held state, then display the first screen in place of the lock screen.

7. A method for controlling an electronic device, comprising:
displaying a lock screen on a display of the electronic device;
detecting a registered touch on a user interface of the electronic device to cancel limitation of operations of the electronic device when the lock screen is displayed;
when the detected registered touch is a detected registered finger touch, then canceling the limitation of operations and displaying a first screen on the display; and
when the detected registered touch is a detected registered thumb touch, then
determining that the electronic device is in one of a state of being held or a not-held state based on a sensor of the electronic device;
when the electronic device is in a not-held state, then canceling the limitation of operations and displaying the first screen, and
when the electronic device is in the state of being held, then canceling the limitation of operations and displaying a second screen, which is different from the first screen, on the display.

8. A non-transitory computer readable medium that stores a control program comprising instructions, which when executed by an electronic device with a display, a user interface and a motion sensor, causes the electronic device to:
display a lock screen on the display;
detect a user touch on the user interface;
when the user touch is a not-registered touch, then maintain display of the lock screen;
when the detected user touch is a registered finger touch, then display a home screen; and
when the detected user touch is a registered thumb touch, then
determine a state of the electronic device based on an output of the motion sensor, the state comprising one of a state of being held and a not-held state;
when the detected state is the state of being held, then display a modified home screen; and
when the detected state is a not-held state, then display the home screen.

* * * * *